United States Patent
Kirkpatrick et al.

[15] 3,665,260
[45] May 23, 1972

[54] ALLOY CAPACITOR POROUS ANODES

[72] Inventors: Milton E. Kirkpatrick, Palos Verdes Peninsula; Ralph A. Mendelson, Westminster, both of Calif.

[73] Assignee: TRW Inc., Redondo Beach, Calif.

[22] Filed: June 1, 1970

[21] Appl. No.: 42,087

[52] U.S. Cl. ................................317/230, 29/570, 317/238
[51] Int. Cl. ................................H01g 9/00, H01g 3/075
[58] Field of Search ................................317/230, 231, 233

[56] References Cited

UNITED STATES PATENTS

| | | | |
|---|---|---|---|
| 1,682,846 | 9/1928 | Kremers | 317/233 |
| 1,709,427 | 4/1929 | Bush | 317/230 |
| 1,924,606 | 8/1933 | Hammond | 317/231 |
| 2,024,240 | 12/1935 | Mershon | 317/230 |
| 2,299,228 | 10/1942 | Gray et al. | 317/230 |
| 2,504,178 | 4/1950 | Burnham et al. | 317/230 |
| 3,166,693 | 1/1965 | Haring et al. | 317/230 |

*Primary Examiner*—James D. Kallam
*Attorney*—Daniel T. Anderson, James V. Tura and Alan D. Akers

[57] ABSTRACT

Alloys of intermetallic compounds and solid solutions are prepared as powders, compacted, and sintered at high temperatures to form porous, single phase alloys; the porous alloys are then surface-oxidized such as by anodization to form a mixed metal oxide film on the surfaces of the porous structure. This results in a mixed metal oxide surface film having good dielectric properties. The placement of conductive material in the void space of the porous anode results in the formation of a capacitor structure of superior properties.

The general formula for the sintered alloys is AB where A and B are metals in the form of solid solutions or intermetallic compound alloys. Of specific interest are those 1:1 compounds which form $ABO_3$ oxides. Preferred materials include YAl, CoTi and NiTi alloys. These AB sintered alloys are oxidized or anodized to form surface films of $ABO_3$ and $A_xB_yO_z$.

16 Claims, 7 Drawing Figures

YAL (-325) ETCHED 200 X

Patented May 23, 1972

YAL (-325) ETCHED 200X

YAL 100X

Milton E. Kirkpatrick
Ralph A. Mendelson
INVENTORS

James V. Tura
ATTORNEY

YAL ANODE 10X

−500 $Mn(NO_3)_2$ IMPREGNATED 200X

Milton E. Kirkpatrick
Ralph A. Mendelson
INVENTORS

ATTORNEY

Ti-Ni 100X DARKFIELD

Ti-Co 100X

Milton E. Kirkpatrick
Ralph A. Mendelson
INVENTORS

Electron Micrograph of Exposed Oxide Layer from a Nickel-Titanium Alloy Capacitor (Magnification 20,000 X; 1μ fiducial marks)

ALLOY CAPACITOR POROUS ANODES

BACKGROUND OF THE INVENTION

This invention relates to new and improved porous anodes for capacitors and more specifically to capacitors of the $ABO_3$ and $A_xB_nO_y$ type which are composed of porous, surface-oxidized particles, such as those of YAl, CoTi and NiTi.

The use of tantalum capacitors including the porous tantalum types are well known in the electronic field. While their capacitance on an anode volume basis or on an anode weight basis is excellent, tantalum is quite expensive.

It is known that several of the group of mixed metal oxides involving the general composition $ABO_3$, exhibit extremely high dielectric properties. An example of these compound types is barium titanate ($BaTiO_3$) which has been used as ceramic capacitors for many years because of its high dielectric constant.

One of the main problems which have prevented the development of BaTi porous alloy anodes for porous sintered capacitors is the fact that the two metallic elements have widely different melting temperatures. As a result, almost insurmountable difficulties are encountered in the formation of these alloys. Porous metallic alloys of other pure metals do not provide significant increases in dielectric properties.

It is known to sinter together particles of $BaTiO_3$ to form ceramic capacitors; however, they do not provide the high surface area of porous structures. Therefore, their capacitance is based on the external surface area rather than the internal surface area of a sponge-like porous structure such as the porous slug type anodes used in tantalum slug capacitors.

It is, therefore, an object of the invention to provide new and improved capacitor materials through the use of alloy materials.

Another object of this invention is to provide porous sintered anodes of alloys of the type AB which, when oxidized, form $ABO_3$ and $A_xB_nO_y$ types.

Another object is to provide porous sintered anodes for capacitors of compositions comprising YAl, NiTi and CoTi which can be oxidized or anodized to form high quality dielectric films.

Another object is to provide new compositions of matter comprising: porous, sintered alloys of metals A and B which form $ABO_3$ and $A_xB_nO_y$ upon surface oxidation.

Another object is to provide new compositions of matter comprising: porous, sintered, surface-oxidized particles of YAl, CoTi and NiTi.

According to the invention, a solid solution or an intermetallic AB alloy such as YAl, NiTi or CoTi is first formed and then converted to a fine powder, such as by crushing. The powder is then compacted into a suitable anode shape and sintered at elevated temperatures; this will produce a porous sintered anode having an interconnected structure. The compacted porous structure is then surface oxidized; this may be carried out in air or by permeating the porous structure with a suitable electrolyte and then anodizing.

In contrast to the above-mentioned $BaTiO_3$ ceramic capacitors, the porous interconnected structures of the present invention provide a large, internal surface area which in turn yields a much larger capacitance.

The invention may be more readily understood from the description to follow and from the diagrams in which.

Figure 1:
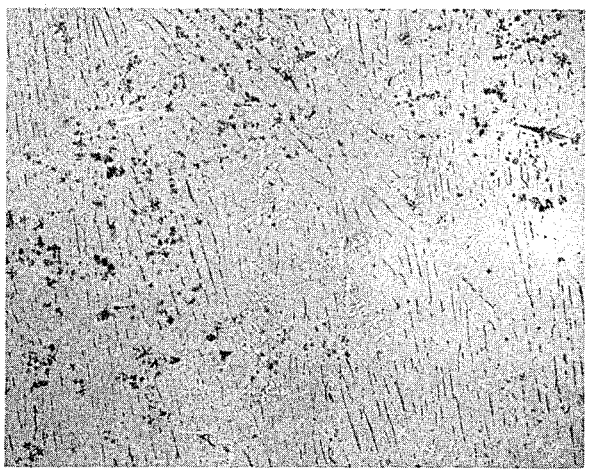

The first stage in the production of a YAl capacitor is the production of a 1:1 YAl alloy which exists as an intermetallic compound. The weight percent of the metals employed in order to obtain the 1:1 alloy is 24.0 W/O Al and 76.0 W/O Y. The Al and Y in the form of powders were arc melted to achieve good mixing and consolidation of the two elements:

X-ray analysis established that alloying had, in fact, taken place. FIG. 1 shows the photomicrograph of the Al/Y compound and indicates that a single phase alloy had been formed. The alloy remained stable under all fabrication procedures including cutting, grinding, polishing, and etching to bring out the microstructure.

It should be emphasized at this point that alloys of intermetallic compounds of the 1:1 atomic composition can, in many cases, exist over a range of compositions and that this compositional variation may result in alloys somewhat different in atomic ratio than the 1:1 composition, but having the same crystal structure as the stoichiometric 1:1 compound. Such compounds, even though they vary over a limited range in composition, will produce similar results when oxidized, with regard to their application as capacitor anodes. This compositional variation is due in part to both atomic and thermodynamic considerations. Additionally, compositional variations may result due to manufacturing process variables which can occur during the melting and solidification of the alloy. Thus, a range of alloy compositions around the intended stoichiometric composition will result in similar capacitor properties.

After the YAl ingot was formed, it was then crushed to a powder. This is a relatively easy procedure because the YAl intermetallic compound is extremely brittle. The crushing produced powders which could be classified into four distinct size ranges: −500, −400, to +500, −325 to +400, and +325 mesh. The +325 mesh fraction was recrushed several times in order to produce a powder which could be classified into the first three size ranges above mentioned.

The next stage of capacitor production involves compaction and sintering of the powders into porous anodes. Various compaction procedures may be employed; however, the one used is described in U.S. Pat. No. 3,496,425. Electric terminals in the form of metallic lead wires were applied by incorporating into the anodes during compaction.

Figure 2:
FIGS. 1, 2, 4, 5 and 6 are photomicrographs of alloy microstructures in various stages of production.

FIG. 2 shows a compacted YAl powder from a −325 mesh fraction.

Figure 3:
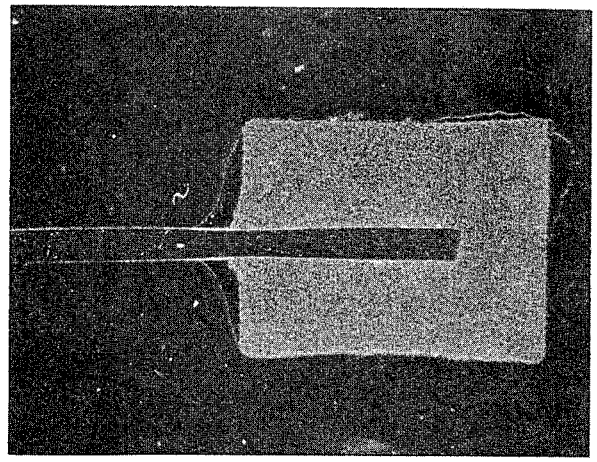
FIG. 3 is an electron micrograph showing an anode section which is mounted in a base.

Following compaction and sintering, a yttrium aluminum oxide coating is formed on the surfaces of the YAl alloy particles. The oxide film can be produced by impregnating the porous anode with 0.1N KOH as the electrolyte, and then anodizing using a current of 40 ma at 100 volts. Other methods of forming oxide coatings will be disclosed herein. FIG. 3 shows the anode.

The final step in the manufacture of the capacitor is the introduction of a counter electrode. This may be accomplished by coating the interconnected, porous AB oxide film with a conductive film. One method of applying the coating of conductive film is by dipping the anode in a solution of $Mn(NO_3)_2$, a preferred specific gravity of the $MN(NO_3)_2$ is 1.41. The dipping will cause the porous anode structure to be impregnated with the solution of $Mn(NO_3)_2$. The anode structure is then baked to convert the $Mn(NO_3)_2$ solution to a $MnO_2$ conductive film coating over the AB oxide film. The dipping and baking procedure is preferably repeated until the entire porous space is filled with the conductive $MnO_2$.

Figure 4:
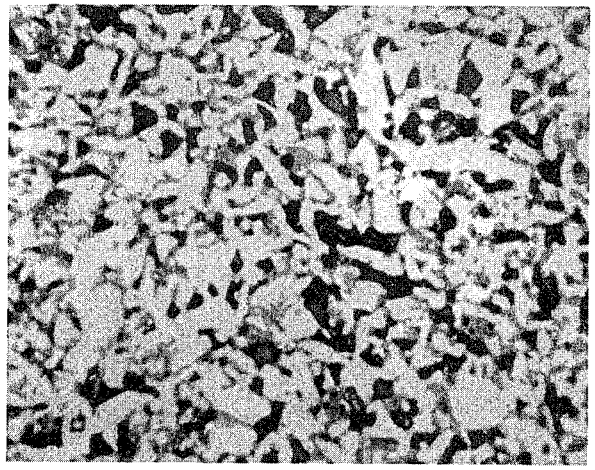

The microstructure of the completed capacitor is shown in FIG. 4.

The $MnO_2$ appears as the grey area. The voids or porous area are the black portions and the white areas are the YAl alloy particles.

Tables I and II show the processing conditions and capacitance values for anodes of YAl particles coated with yttrium aluminum oxide; a tantalum anode formed in $H_3PO_4$ using a formation voltage of about 100 volts is also shown by comparison. Measurements of the capacitance were made with the anodes in the electrolyte using a General Radio 1615-A bridge at 100 $H_z$.

TABLE I

| Compaction | Sintering | Oxide Film |
| --- | --- | --- |

| Anode | Powder | Pressure (TSI) | Temperature (°C.) & Times | Formation Voltage |
|---|---|---|---|---|
| YAl (1) | −500 mesh | 2.5 | 1000, 1 hr. | 100 |
| YAl (2) | −325 mesh | 2.5 | 800, 15 min. | 98 |
| YAl (3) | −325 mesh | 20 | 1050, 1 hr. | 102 |
| YAl (4) | −325 mesh hydrided/dehydrided | 10 | 1050, 1 hr. | 101 |
| YAl (5) | −325 mesh +5 wt. % 325 mesh Al | 3.5 | 1110, 1 hr. | 102 |
| YAl (6) | −325 mesh +2 wt. % Nopco wax 22 | 3.5 | 1110, 1 hr. | 102 |

TABLE II

| Anode | Capacitance ($\mu f$) | Capacitance Anode Volume ($\mu f/cm.^3$) | Anode Weight ($\mu f/g.$) |
|---|---|---|---|
| Ta (size c) | 83.2 | 269 | 35.8 |
| YAl (1) | 52.2 | 440 | 213.0 |
| YAl (2) | 21.4 | 235 | 74.7 |
| YAl (3) | 44.8 | 427 | 168.0 |
| YAl (4) | 41.1 | 367 | 154.0 |
| YAl (5) | 21.0 | 184 | 76.6 |
| YAl (6) | 20.5 | 183 | 71.6 |

It will be observed from Tables I and II that the YAl anodes 2 and 3, which were formed from the same sized mesh powder but at widely different pressures and sintering temperatures, exhibit markedly differing capacitances. Thus, the process permits capacitors having a wide range of capacitance values to be produced. It will also be observed that the capacitance of the YAl oxide coated anodes in terms of anode weight is markedly superior to the tantalum anodes.

From the tables, it will appear that good results are obtained using a small particle size (−500 mesh).

Figure 5:
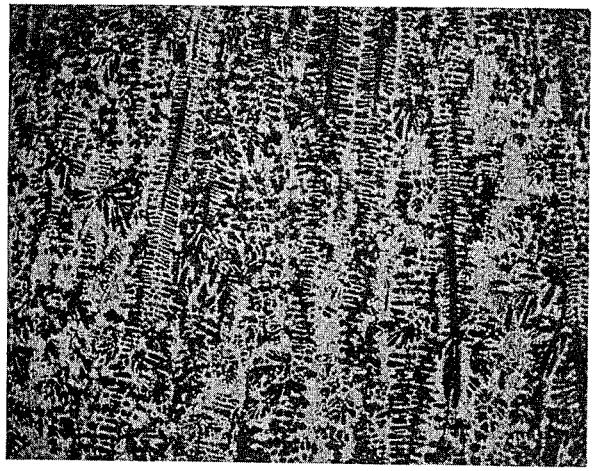
Figure 6:
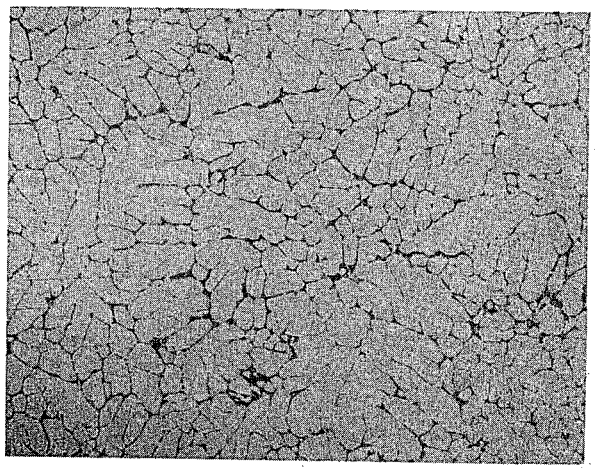

Alloys of NiTi and CoTi were next fabricated using a Materials Research Corp. Series V-4 electron beam vacuum melting module. In both cases, 55.0 W/O Co and 55.0 W/O Ni were employed with the balance being 45.0 W/O Ti; this produced the 1:1 intermetallic compound in both cases. X-ray diffraction analysis of the alloy buttons indicated that the 1:1 compound was indeed formed and metallographic analysis were made on the alloys in order to determine the microstructure. FIGS. 5 and 6 are photomicrographs at 100 magnification showing the 1:1 NiTi and CoTi microstructures respectively.

Following production of the 1:1 alloys into ingots, they may be powdered and compressed using the same techniques as disclosed for the YAl powder preparation.

The preferred method for producing the oxide film on the alloys involves anodization. For this purpose, five different electrolyte compositions were employed for the NiTi and CoTi alloys; viz., $H_2SO_4$, $H_3PO_4$, $Cr_2O_3$, $H_2SO_4$ plus oxalic acid, and a concentrated (15 volume percent) $H_2SO_4$ solution. Utilizing Pourbaix diagrams, a pH of 2 appeared most suitable for maintaining the nickel and cobalt in their oxidation states during anodization. The best anodization of the NiTi compound was obtained with the $H_2SO_4$ solution while the CoTi alloy gave the best anodized films with $H_3PO_4$. It was determined that where the pH exceeded 2 (e.g., 3 and 5), the anode was etched rather than anodized, while a pH of 1 or less caused rapid metal dissolution which disrupted the film forming process. In the case of the YAl compound, very good films were also obtained by utilizing either $H_2SO_4$ or $H_3PO_4$ at a pH of 2.

Using a forming voltage of 35 volts and current densities of about 100 or 200 milliamps per square centimeter, satisfactory thick films were formed on the alloys. Current densities less than 200 ma/cm² produced very little if any film on the anode, but rather etched the surface. Film uniformity was achieved by employing a DC voltage with a maximum AC ripple of less than 1 percent. Current control is achieved by inserting dummy anodes under test. 304 ELC stainless steel was employed as the cathode and dummy anode.

The bath temperature was approximately 20° F. and it does not appear that temperature variation is an important variable of the anodization process.

X-ray powder diffraction patterns were taken of the oxide film formed by anodization; these films had been removed from the samples of NiTi and CoTi. The patterns indicated that in all cases the oxide films were amorphous in nature. In the case of the YAl compound, an X-ray diffraction pattern taken of the $H_3PO_4$ anodized film showed crystallinity.

To determine the capacitance properties of a NiTi capacitor, an anodized sample was coated with copper, and capacitance tests were made using a Boonton Electronics Corp. Model 74D Capacitance Bridge. The test frequency was 100 KH$_z$ with a 10 mV peak to peak test signal. For a capacitor area of 0.0312 square inches and an anodization voltage of 35 volts, the capacitance was 42,300 pF; conductance 1,750 $\mu$hos; and storage factor 15.2.

Figure 7:
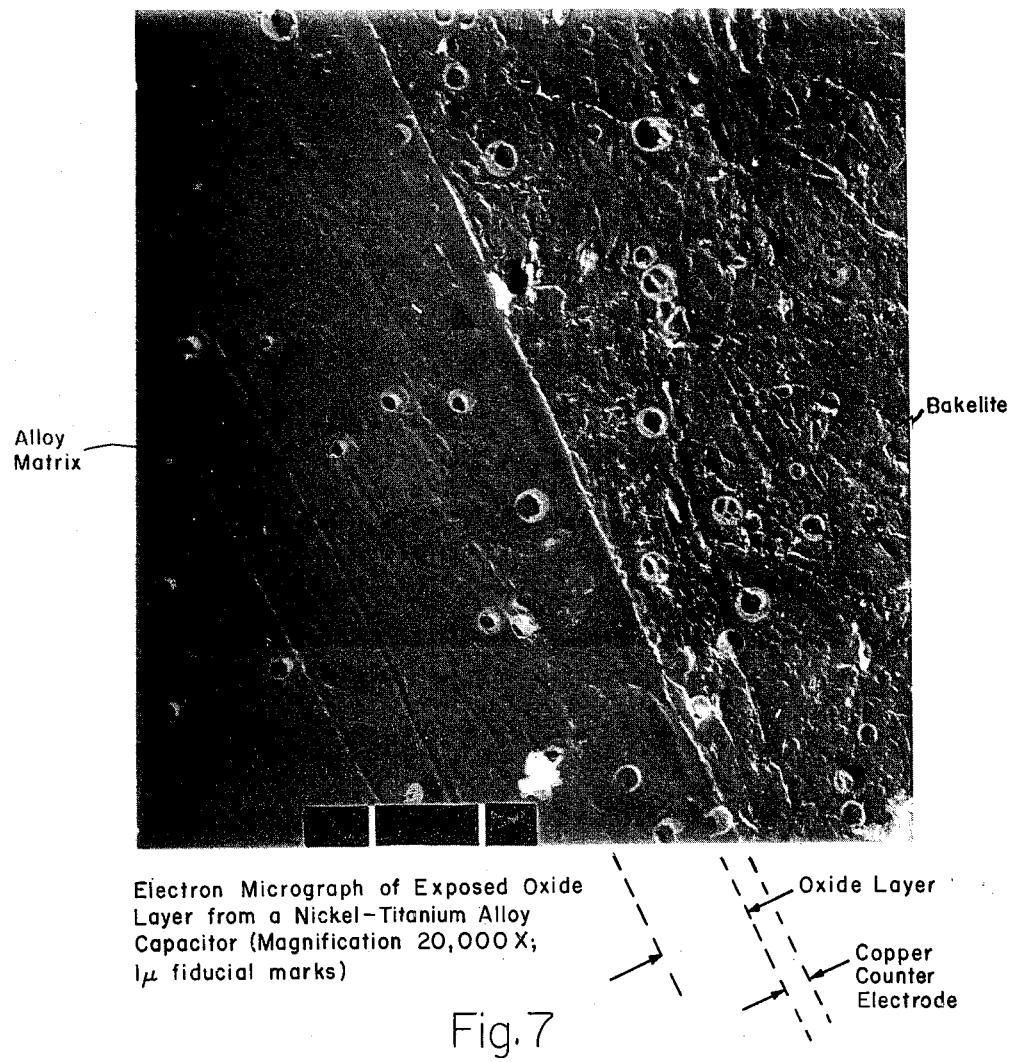
FIG. 7 is an electron micrograph of a NiTi oxide film coating on an anodized capacitor.

In order to accurately measure the anodization thickness and structure, the capacitor was ground to expose the counter electrode/anodized layer/base alloy and the exposed portion was then polished. An electron micrograph was made as shown in FIG. 7. The copper electrode, oxide layer region and the base alloy of nickel titanium can be seen in the micrograph. It will be apparent from the electron micrograph that an oxidation thickness of 0.7 micron was obtained, and this is in agreement with that of photomicrographs which also were taken.

Based on the film thickness of 0.7 micron from the electron micrograph, the dielectric constant of the anodized film on the 1:1 NiTi alloy is approximately 160. Tantalum oxide has a dielectric constant of approximately 25.

As an example of alternate methods for oxidation of the aforementioned AB alloys, oxide films may be grown on sintered, porous particles of CoTi and NiTi in air at about 867° C. for 24 hours. For example, oxide films were grown on polished samples of YAl, CoTi and NiTi in air at about 867° C. for 24 hours. X-ray diffraction analysis of both the NiTi and CoTi oxide films showed the presence of a mixed metal oxide structure.

Capacitance measurements were made of the CoTi-thermal oxide-Au formed in the argon-air atmosphere. Assuming a film thickness of approximately 1,000 A as expected from the blue interference color, the dielectric constant is well above 100.

In addition to forming oxides by exposure to air, other techniques for growing the oxide film are available. For example, by exposing thick films of NiTi and CoTi to an inert gas containing oxygen such as 90 percent argon and 10 percent oxygen, at 100° C. for 1 hour, adherent blue colored films (due to interference effects) were formed. Gold electrodes were applied to the oxide film by evaporation techniques. Of course, use of vacuum deposited counter electrodes may also be employed from the standpoint of either fabrication and capacitance measurement. These electrodes include platinum, copper, etc.

The air oxidation and argon-air oxidation techniques may be applied to the porous capacitors in addition to the thin films as disclosed above.

It will be recognized that many interrelated parameters are possible within the scope of this invention. These parameters include: particle size, the chemical, electrical and metallurgical properties of a particular AB compound and AB oxide, the powdering process, compaction procedures such as pressure and time, sintering temperatures and times, anodization or other oxide film forming procedures, desired performance characteristics such as: capacitance and leakage properties, operating range, reliability, etc.

In the claims:

1. A process for producing porous alloy anodes comprising:
   a. forming intermetallic compounds of metals selected from the class consisting of: Y, Al, Co, Ni and Ti, said compounds forming dielectric oxide films upon oxidation;
   b. powdering the said compounds;
   c. compacting and sintering the said powder to form a porous, interconnected structure;
   d. surface oxidizing the porous interconnecting alloy; and
   e. applying an electrical terminal to said structure to form an anode.

2. A process for producing porous alloy capacitors which comprises:
   a. forming intermetallic compounds of metals selected from the class consisting of: Y, Al, Co, Ni and Ti, said compounds forming dielectric oxide films upon oxidation;
   b. powdering the said compounds;
   c. compacting and sintering the said powder to form a porous, interconnected structure;
   d. applying electrical terminals to form an anode;
   e. surface oxidizing the porous interconnecting alloy; and
   f. forming a counter electrode on the oxidized surface.

3. The process of claim 2 in which the atomic ratio of the AB metals in the said compound is 1:1.

4. The process of claim 2 in which the said compound is YAl.

5. The process of claim 2 in which the said compound is NiTi.

6. The process of claim 2 in which the said compound is CoTi.

7. The process of claim 2 in which the said oxidation is by anodization.

8. The process of claim 2 in which the said oxidation is by air oxidation.

9. A porous alloy anode for an electric capacitor comprising:
   a. a powder-compacted, sintered mass defining a porous, interconnected structure;
   b. said structure comprising intermetallic compounds of metals selected from the class consisting of: Y, Al, Co, Ni and Ti, said compounds forming dielectric oxide films upon oxidation; and
   c. an electrical terminal electrically interconnected with said structure.

10. A porous alloy capacitor comprising:
    a. a powder-compacted, sintered mass defining a porous, interconnected structure;
    b. said structure comprising intermetallic compounds of metals selected from the class consisting of: Y, Al, Co, Ni and Ti, said compounds forming dielectric oxide films upon oxidation;
    c. an electrical terminal electrically interconnected with said structure;
    d. the porous interconnections being coated with the oxide film of said compound; and
    e. a counter electrode electrically connected to said oxide film.

11. The capacitor of claim 10 in the ratio of the AB metals in the said compound is 1:1.

12. The capacitor of claim 10 in which the said compound is YAl.

13. The capacitor of claim 10 in which the said compound is NiTi.

14. The capacitor of claim 10 in which the said compound is CoTi.

15. The capacitor of claim 10 in which the said oxide film is formed by anodization.

16. The capacitor of claim 10 in which the said oxide film is formed by air oxidation.

* * * * *